Dec. 20, 1966 J. LOEHR 3,293,367
BINARY SWITCHING INTERCOMMUNICATING TELEPHONE SYSTEM
Filed Aug. 27, 1963 3 Sheets-Sheet 1

JOHN LOEHR
INVENTOR.
BY R. E. Geauque
ATTORNEY

Dec. 20, 1966 J. LOEHR 3,293,367

BINARY SWITCHING INTERCOMMUNICATING TELEPHONE SYSTEM

Filed Aug. 27, 1963 3 Sheets-Sheet 2

INVENTOR.
JOHN LOEHR
BY R. E. Geauque
ATTORNEY

INVENTOR
JOHN LOEHR
BY R. E. Geauque
ATTORNEY

United States Patent Office 3,293,367

Patented Dec. 20, 1966

3,293,367

BINARY SWITCHING INTERCOMMUNICATING TELEPHONE SYSTEM

John Loehr, 9149 White Oak Ave., Northridge, Calif. 91324

Filed Aug. 27, 1963, Ser. No. 304,837
9 Claims. (Cl. 179—18)

This invention relates to intercommunicating telephone systems, and more particularly to a selective intercommunicating system employing binary station selection switching instead of decimal sequential impulse station selection employed heretofore.

In intercommunicating telephone systems, it is the usual arrangement to provide a single talking path over which two or more stations may converse simultaneously. In general, these telephone intercommunicating systems share a common talking path which may be seized by any and all stations in the system. Major drawbacks of prior intercommunicating systems are their lack of privacy afforded to the conversants and the number of conversations which may be handled at one time. Various common talking path intercommunicating systems have been developed that provide exclusion or lockout circuits whereby privacy may be insured to conversing stations, prohibiting other stations from listening to the conversation. Exclusion-type common talking systems require relatively expensive control circuits individual to each substation as well as a certain amount of common control equipment at the central station to provide the necessary exclusion features. It is obvious, therefore, that the cost of intercommunicating systems with this type of exclusion means to provide privacy will be relatively high.

Another arrangement employed in intercommunicating telephone systems to provide complete privacy is to provide direct interconnecting talking paths between all stations. Non-common talking systems which provide direction connection to any one of a plurality of substations present prohibitively high installation costs in all but those cases wherein the number of stations, and the distance therebetween, is small.

In accordance with the present invention, there is provided an intercommunicating telephone system which affords complete privacy yet which is economically competitive with common talking systems since it requires neither individual exclusion circuits at each substation nor multiple lines interconnecting all stations.

The principal feature of the invention involves novel facilities and switching circuits which permit station-to-station interconnections to be made by means of binary calling codes, thus minimizing the number of direct lines required at each station. Another feature of the invention is a novel selective signalling system operative in response to a selector drum identifying the called station in accordance with a binary digit code. Each station requires a two-wire talking path, a common battery return path, plus a number of signalling wires equal in number to the exponent of the radix two corresponding to the maximum number of substations in the system. For example, five signalling lines will permit selection of any one of $2^5-1$ or 31 called stations by a calling station for private non-common talking interconnection.

In addition to greatly reducing the number of interconnecting lines between stations and/or the substantial elimination of exclusion circuits, the binary selective switching arrangement of the present invention provides a number of other advantages. For example, the invention provides index-type station selection wherein a called station is selected by merely indexing a selector drum at the calling station. Switching is accomplished in a parallel, rather than a sequential, mode, thus providing substantially instantaneous signalling. The signalling wires or "code conductors" are installed in a loop manner between stations, thus facilitating installation and reducing installation costs.

A large number of auxiliary features, such as ring-back, conference-call connection, talk-only, listen-only, paging, dictation, etc., can readily be accommodated in the system of the present invention. The actual switching and control circuits at the central station also provide a number of significant advantages over the prior art. For example, both the finder and selector switching functions progress simultaneously, thus greatly increasing the speed of interconnection between the calling and called stations. Self-test and interlock features are also inherent within the novel circuits of the invention, as will appear hereinafter. It is also important to note that the invention is not limited to a specific type of central station switching mechanism. From the description of the exemplary embodiment set forth hereinafter, it will be apparent to those versed in the art that a practical system may be implemented in accordance with the teaching of the invention to utilize various conventional system components. The central station may employ rotary steppers, cross-bar switches, relay chains, or any one of a number of equivalent mechanisms to effect the novel switching functions to be described in detail hereinafter.

The invention resides partly in the physical and electrical structures and inter-relationships embodied in the selector-drum substation telephone instrument and the binary-control switching circuits at the central station of the system as herein specifically illustrated, but also embraces the concept of the system itself, considered as an integrated whole, and independently of the structural details of its several parts.

It is therefore a principal object of the invention to provide a novel and improved intercommunication telephone system utilizing binary selection of a called station, among a plurality of stations, by a calling station.

Another object of the invention is to provide novel and improved means to permit station-to-station selective signalling and non-common talking paths between stations of an intercommunicating telephone system.

Yet another object of the invention is the selective calling of system stations by the rotation of a calling station selector drum to a single index position, and thereby automatically transmit a binary code in a parallel mode to the central station.

A still further object of the invention is the provision of loop code conductors between system stations of an intercommunicating telephone system and thereby minimize installation costs.

Another object of the invention is the establishment of a conference of selected stations by use of a single indexed calling code identifying the particular combination of stations called.

A general object of the invention is to provide novel and improved intercommunicating apparatus which overcomes disadvantages of previous means and methods heretofore intended to accomplish generally similar purposes.

Still another object of the invention is the improvement of intercommunicating systems, generally.

The features of the invention which are believed to be novel are set forth with particularity in the appended claims. The present invention itself, both as to its organization and manner of operation, together with further objects and advantages thereof, may best be understood by reference to the following description taken in connection with the accompanying drawings, in which like reference characters refer to similar parts and in which:

As briefly stated hereinabove, the apparatus of the present invention comprises an intercommunicating system resembling a private automatic exchange telephone system but which utilizes binary selection in lieu of the sequential-impulse selection system of conventional dial telephones. This system permits substantially instantaneous selection of one or more called stations by merely bringing into view the name and/or location of the called station on a selector drum at the calling station. By way of example, there will now be described a system capable of selecting any one of 63 stations, signalling, and establishing a non-common talking path between the calling and the called station. The system may thereafter establish additional station interconnections. It should be understood, however, that a 63-station system is merely exemplary, since fewer or greater numbers of stations may be accommodated by suitable and straightforward adaptation of the system, as will become apparent to those versed in the art from the discussion which follows:

The system somewhat resembles a conventional three-wire system but with the third wire and binary conductors looped between the separate stations. The remaining two wires comprise the talking path and connect directly with the central station. In the exemplary embodiment each station is provided with a station selector drum carrying 63 station names. Upon indexing the drum to any one station name, the station selected will be called and alerted merely by lifting the handset and/or depressing a calling key at the calling station.

Pilot binary relays, responsive to circuit connections established by the selector drum at the calling station, activate primary binary relays which are self-holding. A series of contacts on the primary binary relays serve to retard the switching section. The primary binary relays decode the binary calling code and cause a selector wiper to stop at a contact corresponding to the called station code. An interference guard relay inhibits operation of the pilot relays until the selector and finder functions have been completed. Line relays and a power supply are also located at the central station.

The central station equiment may be mounted in racks in a well-known arrangement as employed by conventional switchboard equipment.

Figure 1:
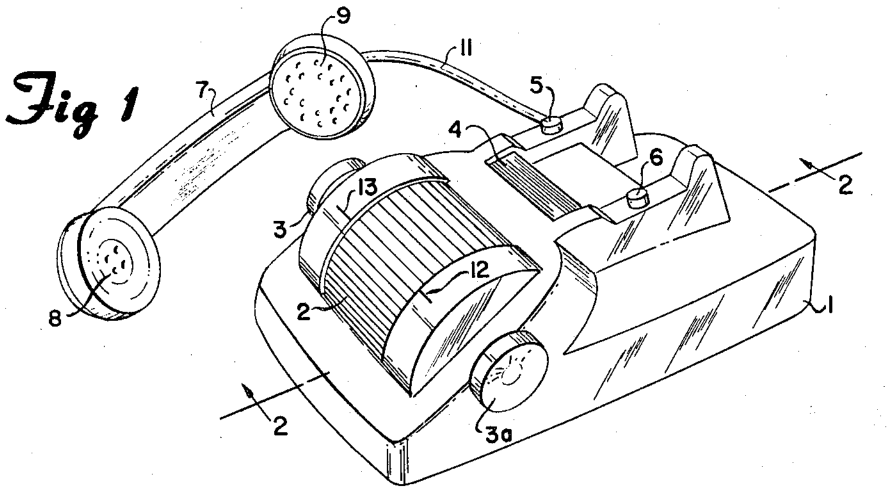
FIGURE 1 is a perspective view showing a telephone set including a selector drum calling mechanism, illustrative of the present invention.

The telephone instrument which is to be located at each station is shown in FIGURE 1. This instrument comprises a relatively stationary housing 1 containing selector drum 2 which is controlled by knobs 3 and 3*a*. Housing 1 also contains the key bar 4, the alerting device and terminal block. The cradle portion of housing 1 is provided with a hookswitch which is operated by buttons 5 and 6. The handset 7, containing receiver 8 and transmitter 9, is connected to the circuits within the housing 1 by means of interconnecting cord 11.

A call is initiated by turning knob 3 or 3*a* until the name of the station to be called appears on selector drum 2 in alignment with index marks 12 and 13. Thereafter, the handset 7 is removed from the cradle and calling key bar 4 is momentarily depressed. The functioning of the central station circuits in response to this action will be described in a subsequent portion of this specification in connection with FIGURES 4 and 5.

Figure 2:
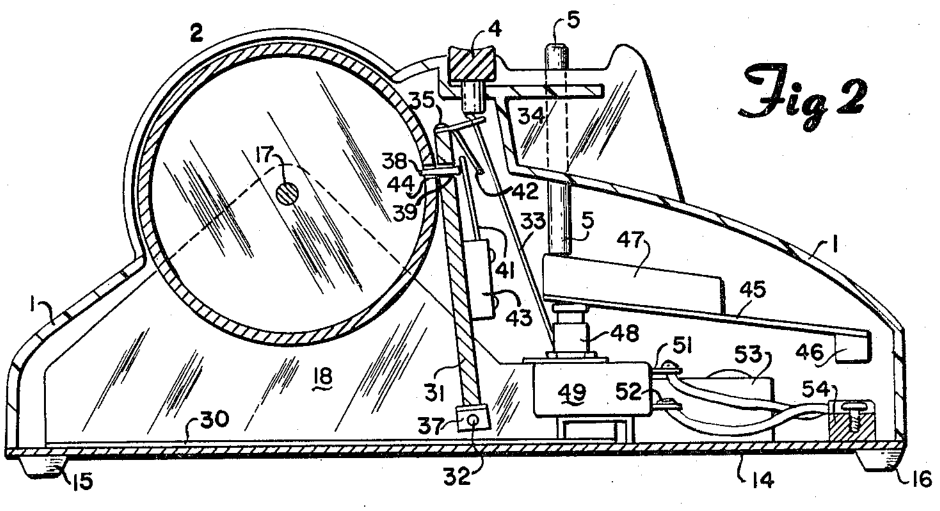
FIGURE 2 is a side sectional view taken along line 2—2 of FIGURE 1.

Looking now at FIGURE 2 there is shown a sectional view of the stationary portion of the telephone instrument of FIGURE 1. The bottom of housing 1 is enclosed by baseplate 14 and is supported on a plurality of resilient feet, two of which are indicated at 15 and 16. Selector drum 2 is preferably fabricated from metal and is rotatably supported on shaft 17. Shaft 17 is in turn supported by a pair of end plates, only one of which (18) can be seen in FIGURE 2. The remaining end plate 19 can be seen in FIGURE 3. End plates 18 and 19 are joined by cross-members 29 and 30. Shaft 17 extends through end plates 18 and 19, as well as through housing 1. Knobs 3 and 3*a* are attached to the ends of shaft 17 for rotation therewith. Selector drum 2 may be rotated upon turning either of the knobs (3 or 3*a*).

Figure 3:
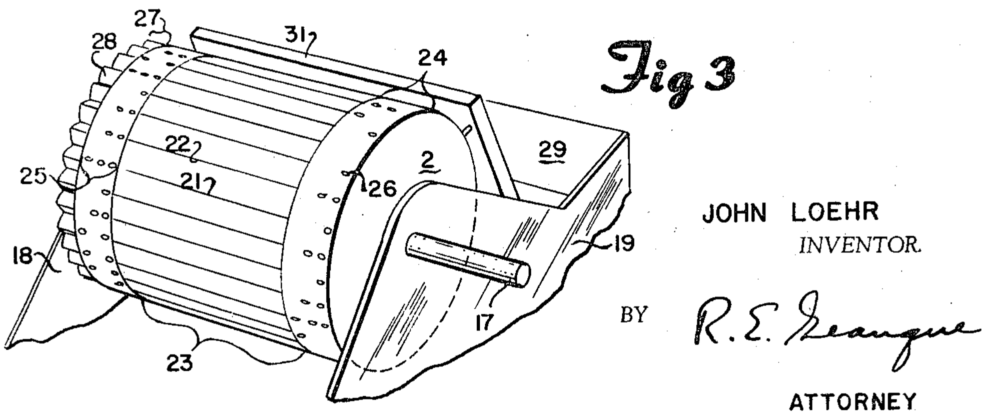
FIGURE 3 is a perspective view, partially broken away, showing details of the selector drum of the apparatus of FIGURES 1 and 2.

Referring now to FIGURE 3, the periphery of selector drum 2 is divided into four zones along its major axis. The central zone 23 is divided into 63 transverse sectors as indicated by the pair of dividing lines at 21 and 22. The name of a particular remote station is written between each pair of dividing lines (e.g. 21 and 22) up to the capacity (viz. 63 names) of the system. It should be understood, of course, that certain of these sectors may be left blank in the event that the system capacity is not fully utilized. Adjacent to either end of the central zone 23 of drum 2 is a zone which carries a plurality of index code holes. These code zones are indicated at 24 and 25. Each zone (24 or 25) carries a series of code holes, which in the example shown may comprise up to three code holes in side-by-side alignment. A typical code hole is indicated at 26. These code holes may be drilled or punched through to the hollow interior of drum 2. The combination of code holes in alignment with each sector are unique for that sector. On the basis of the example shown, in which any one sector may accommodate up to six code holes, six columns of code holes may provide a maximum of $2^6-1$ combinations. Such a system may then have 63 unique calling codes. Zone 27 is provided with a detent wheel having 63 triangular teeth spaced to conform to line spacing of typewriters, which engage a spring biased detent of any suitable construction, fixably mounted to housing 1, in order to facilitate indexing of the called station indicia contained within the sectors of the central zone 23. A greater number of calling codes may be utilized than there are teeth in detent wheel by drilling all holes and using endless belt as code media.

Referring again to FIGURE 2, plate member 31 extends transversely across zones 23–25 of drum 2 and is pivotally supported at its lower end by means of shaft 32 and hinge 37. Shaft 32 is supported at either end by end plates 18 and 19. Plate member 31 may be attached to metal hinge 37 by any suitable means, and is normally held spaced apart from drum 2 by means of leaf spring 33 and interconnecting linkage 34 attached to the top of plate member 31 by means of fastener 35. Key bar 4 is normally urged upwards by the action of leaf spring 33. A downward pressure on key bar 4 will deflect leaf spring 33 and cause plate member 31 to turn through an arc about the pivotal axis of shaft 32 in a direction toward drum 2, to the position shown in FIGURE 2. This arcuate motion of plate member 31, in response to a downward displacement of key bar 4, is used to activate a combination of binary code switches in the signalling loop circuits. In the interests of brevity and clarity, only one of these binary code switches will be described, since each is identical in construction and differs only in its relative placement with respect to drum 2.

Plate member 31 is provided with six horizontally aligned binary code switches. A typical switch comprises contact pin 38 which extends through aperture 39 in plate member 31. Preferably, pin 38 is fabricated from a non-conductive material such as nylon.

Contact spring 41 normally urges pin 38 in a direction toward drum 2. Also, contact spring 41 is spaced apart from contact 42. The lower end of contact spring 41 is supported by block 43.

Upon depressing key bar 4 in a downward direction, to the position shown in FIGURE 2, pin 38 will enter into any aperture in drum 2 which may be aligned therewith (e.g. aligned aperture 44). This action will allow contact spring 41 and contact 42 to remain apart. However, in the absence of an aligned code hole in drum 2, pin 38 will engage the outer surface of drum 2 thus causing contact spring 41 to be deflected into engagement with contact 42, when plate member 31 is pivoted toward drum 2. Thus, the absence of an aligned code hole at an appropriate position on drum 2 will be effective to cause a circuit closure between spring 41 and contact 42. Contact 42 is connected in common with like contacts on the remaining five binary switches; spring 41 is the non-common terminal of the binary switch.

It will now be obvious that the pattern of code holes in alignment with a given index sector of zone 23 of the selector drum will effect a corresponding pattern of binary switch closures, in parallel, upon depressing the key bar 4.

The hookswitch assembly will now be described. Leaf spring 45 has a downwardly extending end portion 46 which is fixedly attached to housing 1, and an upwardly extending end portion 47 which engages the lower end of hookswitch button 5 (see FIGURE 2). This arrangement will cause button 5 to be urged upward under the action of spring 45 whenever the handset 7 is removed from the cradle. This will permit plunger 48 of switch 49 to move upward and close the circuit between terminals 51 and 52. Switch 49 is fixedly attached to housing 1 by any suitable means (not shown). Housing 1 also contains a calling buzzer 53 and a terminal block 54.

The telephone set shown requires two operations in order to initiate a call, the first operation being rotation of the selector drum 2 and the second operation being activation of the key bar 4. However, the system may be readily modified to combine the key bar function with the hookswitch function, whereby the call is initiated by merely lifting the handset 7. Any suitable alerting device may be included in the set in lieu of a buzzer; for example, an intermittent bell, light, or chime may be employed, as will be apparent to those versed in the art. To place a call between two stations, the following sequence of operations is initiated, and will best be understood by referring to FIGURES 4 and 5, taken in combination.

Figure 4:
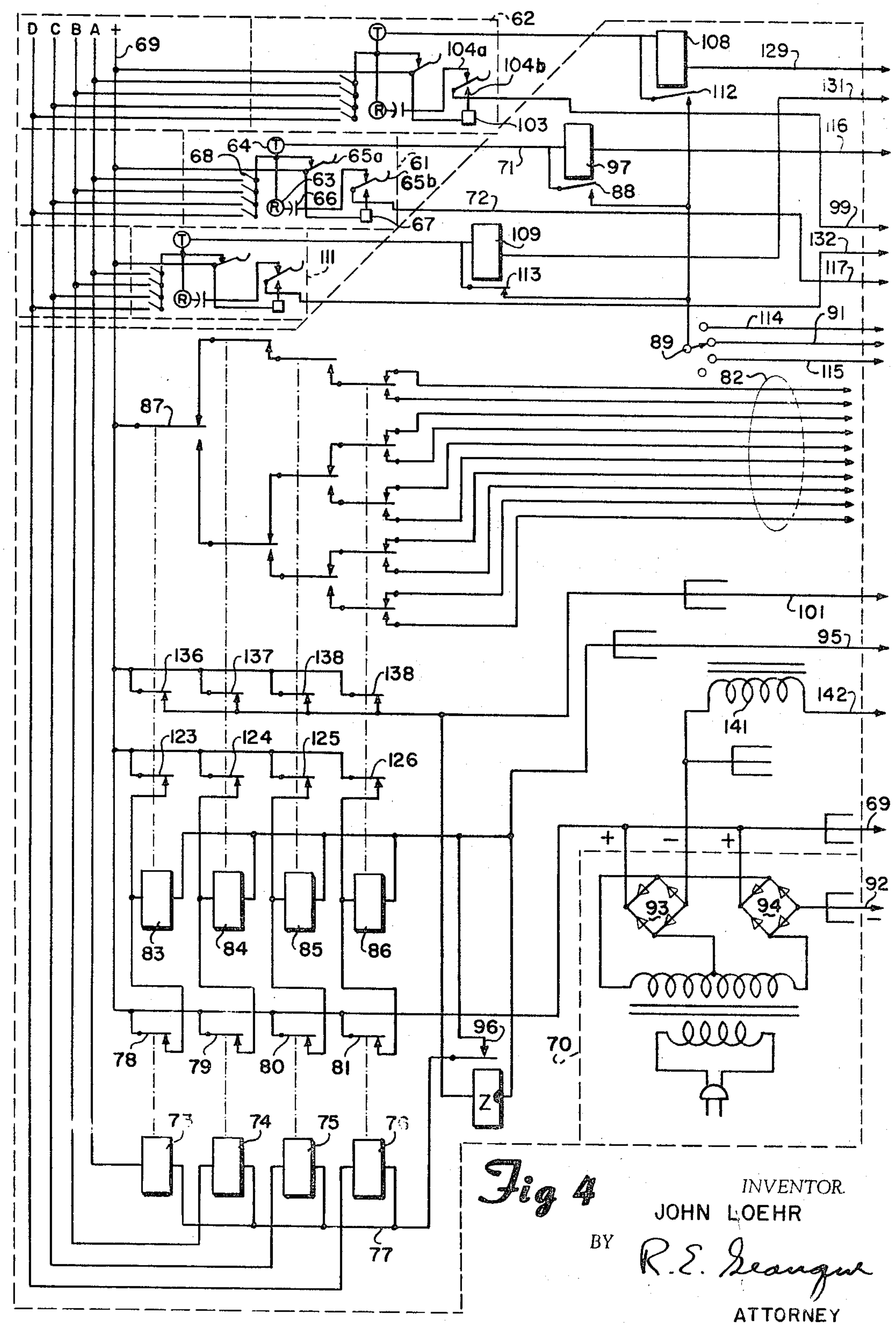
FIGURE 4 is a circuit diagram showing the telephone set, the relay decoding matrix, and the central battery supply portion of the system.
Figure 5:
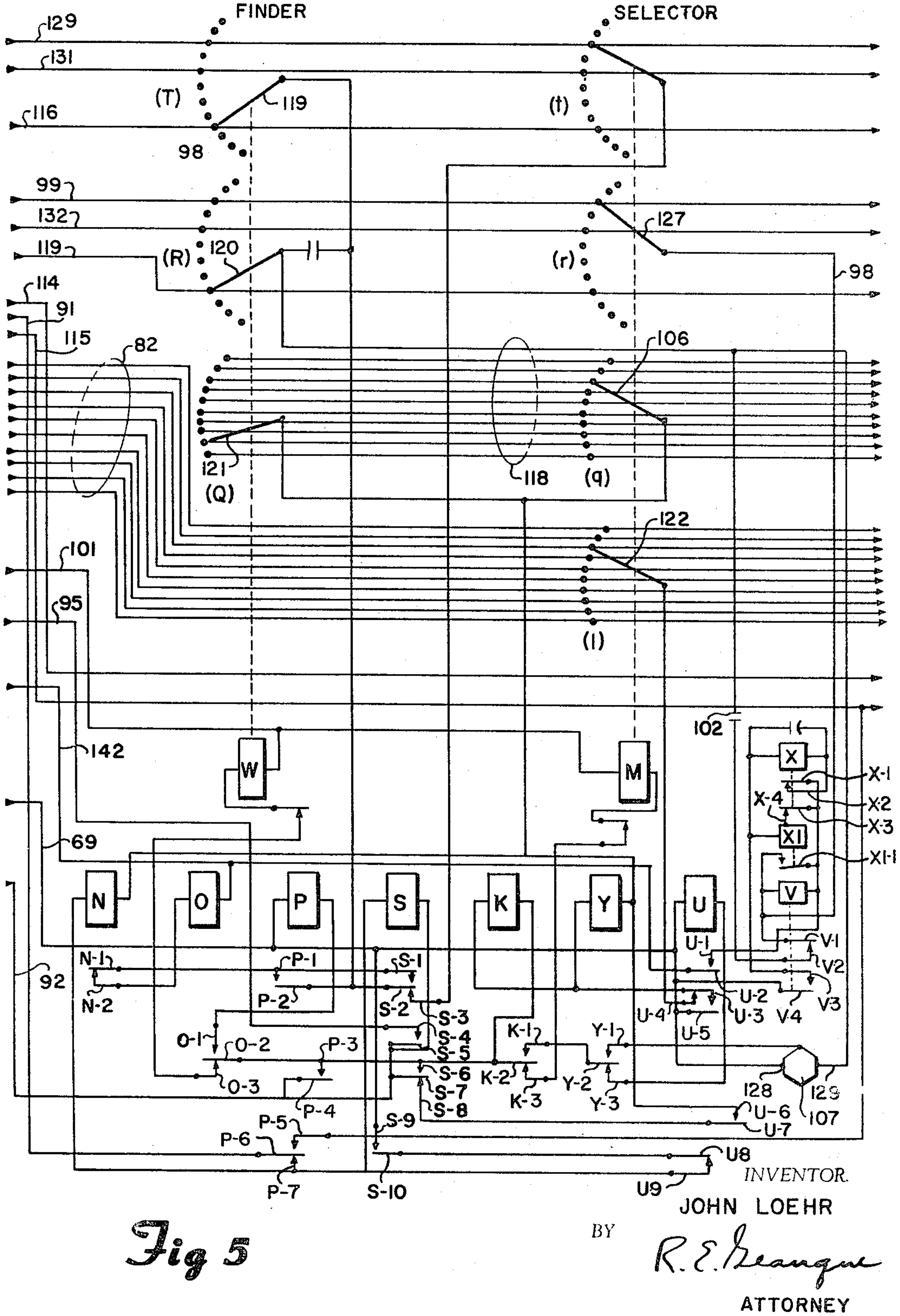
FIGURE 5 is a circuit diagram showing the remaining portion of the central station equipment.

The calling station is assumed to be station 61 and the called station is assumed to be station 62. Station 61 comprises a receiver 63, a transmitter 64, a hookswitch 65*a* and 65*b*, a capacitor 66, a buzzer 67, and four binary coding switches (indicated generally at 68). In the interests of brevity and clarity, a system capacity of 10 stations is shown in FIGURES 4 and 5. In order to accommodate additional stations, it would be necessary to employ additional binary switches.

The arm of hookswitch 65*a* and one terminal of buzzer 67 connect to loop conductor 69 which supplies a positive (+) voltage from the central station battery indicated generally at 70. The central station battery comprises a 12-volt power supply 93 and a 28-volt power supply 94, having their positive terminals connected in common. Loop code conductors A, B, C, and D connect to corresponding ones of the binary code switches 68. Lines 71 and 72 are not looped, but connect directly with the central station equipment. Transmitter 64 connects to line 71, and line 72 connects with the arm of hookswitch 65*b*.

Pilot binary relay coils 73–76 are under the control of loop code conductors A–D, respectively. Line 77 is common to the coils of relays 73–76. Contacts 78–81 are under the control of relay coils 73–76, respectively, and will energize primary binary relay coils 83–86, respectively, when closed. The contacts operated by primary binary relay coils 83–86 comprise a conventional binary decoding matrix and in the embodiment shown, will convert the binary code on loop code conductors A-D to a one-out-of-ten line code. That is, a circuit path will be completed from line 69 at arm contact 87 to only one of the ten lines (indicated at 82) for each possible code combination appearing on loop code conductors A-D.

Subscriber calling station 61 turns the selector dial in order to properly index the name of the called station (e.g. 62). The subscriber of station 61 then removes the handset from the cradle, closing hookswitch contacts 65*a* and 65*b*, and depresses the key bar. This will establish a unique combination of binary switch closures (68) corresponding to the code assigned to the called station. The mechanical functioning of the key bar and binary switches has been described hereinabove in connection with FIGURES 2 and 3. This action will complete a circuit from line 69, through hookswitch contacts 65*a*, through transmitter 64, to the contact 88. The circuit path then extends through start sequence switch 89, line 91, contacts P–6 and P–7, to the start relay S. Picking of the start relay (S) in response to operation of the calling station will close contacts S–1 to S–2, S–4 to S–5, and S–6 to S–7 and S–9 to S–10. The minus 28-volt battery (power supply 94) terminal 92 is applied to all primary binary relays 83–86, both the W and M stepper motors, and the K and U relay coils. However, none of these relay coils can now be energized due to the absence of a completed path to the positive terminal 69.

The negative 28-volt supply, derived via line 92, is applied through S–4 and S–5 to both the pilot and the primary binary relay coils (73–76 and 83–86) via line 95. Now binary code signals received by pilot binary coils 73–76 via loop conductors A–D will close appropriate combination of contacts 78–81 furnishing +28 volts to corresponding combinations of primary relay coils 83–86 causing them to close and self-hold. The positive 28 volts now reach slow-operating limiting relay Z and it opens its contact 96 preventing further code signals from reaching pilot relays 73–76. The postive 28-volt line 69 is now completed to start both the M and W stepper motors. Stepper motor W operates the finder stepper, the first level of which is identified at T and corresponds to the transmitter line 116, the second level of which is identified at R and corresponds to the receiver line 117, and the remaining level (Q) of which is used to test the lines (118) going to other trunks. Stepper motor M operates a four-lever selector stepper switch.

The next function required is to terminate the steppers when they arrive at the calling and called stations. Now a positive 28 volts from hookswitch contact 65*a*, via line relay coil 97, applies the positive potential to finder wiper contact 98. This positive voltage will then be conducted through wiper 119 of level T, contacts S–1 and S–2, and contacts N–1 and N–2 to relay coil O. Contact O–3 opens stopping rotation of the finder wipers 119–121 by motor W. Contact O–1 is now closed to O–2 and supplies minus 28 volts to relay coil P. Contact P–1 closes in anticipation of the time when the positive voltage to relay coil O will be interrupted by the release of relay S. Contact P–3 is now closed to P–4 and will maintain the minus 28 volts in a self-holding mode and the selector section even after relay S releases. Contact P–7 opens thereby removing the positive voltage start signal from coil S. However, coil S does not necessarily release, since it obtains a positive voltage through contacts S–9 and U–8. The closing of contact P–5 will divert any start signals (positive) on the start line on to the next trunk for attention.

When the positive voltage from the primary binary matrix contacts reaches stepper motor M via line 101, the selector stepper will step until wiper 122 finds a voltage on lines 82 from the binary matrix contacts. That is, stepper motor M advances wiper 122 until it coincides with the energized line from the decoding matrix. The output lines from the decoding matrix are indicated generally at 82. A circuit path will then be completed from an arm contact 87 (having the positive supply thereon), through one of the matrix output lines (82), through wiper 122 of selector level 1, through contacts U–3 and U–4 to relay coils Y and K. Since coil Y is not connected at this time to the negative supply, it will not be energized. However, coil K will now be energized, causing contact K–3 to open and stop stepper motor M. Contact K–2 will now divert the negative 28 volts through contacts K–1, Y–2, and Y–3 to coil U. This energizes coil U, which in turn applies a negative 12 volts to coil V via U–1 and U–2. Contacts V–3 and V–4 close to energize X and X1. Coil V is connected in series with buzzer 103 of the called station 62 via line 98, wiper 127, and line 99. This series connection energizes the called station buzzer 103 until the handset at the called station is removed from the cradle, thereby opening hookswitch contact **104*b*. Coil V holds while the buzzer 103 is sounding and until the called station 62 answers. The opening of contact 104*b* will open the circuit to the buzzer (103**) and coil V.

When relay V releases it closes contact V–1 to V–2 thereby completing the connection for talking between the calling station 61 and the called station 62. Capacitor 102 blocks D.-C. voltage in this talking circuit.

Returning now to contact U–3, when this contact is closed to U–5 it opens U–4 and thus replaces the signal from the binary matrix output line (82) via wiper 122 with a positive voltage. This positive voltage serves to hold Y energized even though the signal from the binary matrix will now be opened. Contact U–5 closes so that the minus 28 volts applied to it will be sent on to the test wiper 105.

Contact U–8 now opens, causing relay S to be released and contacts S–7 and S–8 will now apply a negative 28 volts through contacts U–6 and U–7 to the test wipers 121 and 106; so long as the trunk is servicing a station call, this voltage will remain on both the active test lines. A negative 28 volts appearing on a test line (118) indicates a busy station. Contacts S–7 and S–8 apply negative 28 volts to contact U–7 for connection to the test wipers 121 and 106. Whenever a test wiper reaches a busy bank contact, it will energize the negative terminal of coil Y. The matrix output (82) will apply the positive voltage to coils K and Y. Since both the positive and negative voltages are available, Y will be energized. This prevents coil U from being energized, and operating voltage will be applied to busy signal generator 107. Generator 107 may be of any suitable and well-known construction, and is activated by energizing terminal 128; the busy signal output appears on terminal 129.

Summarizing, if Y has negative 28 volts applied when it receives positive 28 volts from U–2, it will be energized and the busy signal generator will be activated instead of energizing U. The calling station 61 hears this busy signal. Also, if coil N has a negative 28 volts applied to it, it will open contact N–2 at the time it is reached by the T finder stepper, and enable the finder wiper (T) to step over it.

The negative side of coil N is connected to the same test line whenever a called station is busy and the positive start signal is then made available to the positive side of coil N. This will open contact N–2 to coil O, permitting the finder stepper wiper 121 to pass over the busy line. From the time the handset is lifted to this point in the sequence of switching operations, requires an average elapsed time of approximately 1 second.

Both the calling station 61 and the called station 62 must hang up to release the connection.

The basic functioning of the system having been described, additional details of the system will now be considered. As can be seen from the foregoing description, the relay control portion of the central station equipment consists of ten control relays (N, O, P, S, K, Y, U, V, X and X1) and a busy-signal generator 107. The function of these control relays are interdependent with binary-decoding and finder-selector switching sections.

The switching section (finder and/or selector) may comprise any suitable mechanism capable of connecting two station lines together in response to a voltage applied to the designating conductors, to complete a continuous path between any two stations. Typical of such mechanism are cross-bar switches, uniselectors, motor driven switches, or self-stepping rotary switches. The number of finder-selector switching sections employed in a given system is determined by the number of simultaneous talking paths desired.

It should be understood that virtually any number of stations may be accommodated by looping the binary code conductors and the common positive line to the various stations, extending the binary decoding relay matrix, and suitably increasing the number of finder-selector switching sections. It should be noted that each station has a corresponding line relay at the central station. In the embodiment shown, line relay 97 is connected to station 61 via line 71; line relay 108 is connected to station 62; line relay 109 is connected to station 111. Line relay 108 is energized via line 129; line relay 109 is energized via line 131. Station 111 is connected to the central station via line 132. The line relay contacts (88, 112, 113) are in series with the start sequence switch 89. This switch (89) may be used to transfer all calls from the telephone first through the "P–5, P–6" relay contacts of any trunk in a system. This will cause that trunk to have first chance to service any calls and thereby distribute contact wear. As shown in FIGURES 4 and 5, switch 89 is set to complete a path from the line relays (97, 108, 109) to line 91. Lines 114 and 115 may connect to relay banks of the other trunk assemblies.

The primary binary relays (83–86) self-hold through contacts 123–126, respectively, until both the finding and selecting functions have been completed or indicated busy. The finder-selector stepper switches cannot begin stepping unless at least one of the primary binary relays (83–86) has been energized. This control is accomplished via contacts 136–139 which are interposed between the postive supply line 69 and line 101 which connects to the finder motor W and the selector motor M.

Choke 141 is connected in series with the negative 12-volt supply output appearing on line 142.

The interference guard relay Z opens the common potential to the pilot binary relays (73–76) via line 77 as soon as the primary binary relays (83–86) have established their self-holding condition, to prevent changes in their setting by a new incoming station calling code, until the initial station selection function is completed. The finder and the selector steppers are activated simultaneously.

The line relay coils (97, 108 and 109) are connected in series with the holding relay O, via the T wiper contact. The winding of relay O serves also to limit the current from the filtered D.-C. source against the two transmitters. Neither the pilot binary relays 73–76 nor the primary binary relays 83–86 can function until the start signal via one of the line relays (97, 108, 109) has energized the start relay S. Therefore, the handset must be removed from the cradle to energize the corresponding line relay, before depressing the key bar to transmit the calling code.

All of the lines extending from the right-hand side of FIGURE 5 connect to other trunks, the number of which is determined by the desired system capacity, both as regards the total number of stations and the maximum traffic density. The switching system shown will transfer calling signals to other trunks until all trunks are occupied before a call is skipped and indicated.

As will be apparent to those versed in the art, the alerting device at each station may take any one of a number of forms. For example, a single stroke bell or chime may be substituted for a continuous buzzer. Also, intermittent ringing may be employed by any suitable and well-known means. The particular system shown provides ring-back. That is, a ring-back will be heard at the calling station if the called line is idle, thus indicating that the called station is being signalled.

If desired, a thermal or capacitive flasher may be employed with relays V, X and X1 to provide intermittent ringing. Relay V is connected in series with the alerting device (i.e. chime or buzzer) and will disconnect the flasher at the selector when the handset is lifted from the cradle at the called station.

To establish a conference call, a binary code is assigned to each desired conference arrangement and such combination of stations is shown on the selector drum at such stations as are permitted to call conferences. The selector stepper will then be provided with bank contacts which are connected in parallel to more than one station through a conference connector (not shown). Thus, a group of stations can be signalled and all who answer can converse.

Without further analysis, the foregoing will so fully reveal the essential subject matter of the intercommunicating telephone system of the invention that others can, by applying current knowledge, readily adapt the system to various applications without omitting features that, from the standpoint of prior art, fairly consitute essential characteristics fo the generic or specific aspects of this invention. For example, station codes may be assigned to talk-only, listen-only, paging, dictation recording, and like auxiliary functions, without significant modification of the basic binary signalling, finder-selector switching system. Therefore, such adaptations should and are intended to be comprehended within the meaning and range of equivalence of the following claims.

What is claimed is:

1. An intercommunicating telephone system comprising:
- a plurality of substations including a first substation for initiating a call and a second substation for receiving said call, each of said substations having a unique binary calling code;
- a plurality of code conductors looped between said substations;
- coding means including a mechanical selector means representing said calling code located at said initiating substation and including switch means corresponding to said calling code means being responsive to the initiation of said call to said receiving substation for producing a coding signal in said code conductors designating the receiving substation;
- connecting means responsive to the initiating of said call at said initiating substation and to said code signal in said code conductors for connecting said initiating substation with said receiving substation.

2. An intercommunicating telephone system as defined in claim 1 wherein said coding means comprises:
- a plurality of switch contacts incorporated into said switch means for applying said binary calling code in parallel to said code conductors for private non-common talking interconnection between said first substation and said second substation.

3. An intercommunicating telephone system as defined in claim 1 wherein said calling code comprises a parallel binary code and said connecting means includes;
- decoding means responsive to said parallel binary code to establish a single line code corresponding to the unique calling code of said receiving station.

4. An intercommunicating telephone system comprising:
- a plurality of substations for initiating and receiving calls, each of said substations having a unique binary calling code;
- a plurality of code conductors looped between said substations; mechanical selector means having coding means arranged thereon corresponding to the unique binary calling code of each of the plurality of substations;
- binary switch means located at each of said substations responsive to the mechanical selector means for applying binary coded calling signals, corresponding to a selected called substation, to said code conductors for private non-common talking interconnection between the calling and the called substation;
- decoding matrix means having a plurality of input lines connected to said code conductors and a plurality of output lines, and responsive to said binary coded calling signals appearing on said input lines to provide a single output signal on one of said output lines, said single output line corresponding to the particular binary calling code initiated by a calling substation;
- a central equipment station to which each of said substations is connected;
- line selector means located at said central equipment station having first and second levels of fixed contacts, each contact of said first level being connected to a corresponding one of said substations, and each contact of said second level being connected to a corresponding one of said output lines, and first and second moving contacts which may be connected to selected ones of said first and second fixed contacts, respectively;
- line finder means located at said central equipment station responsive to activation of a calling substation to connect said calling substation to said first moving contact; and
- control relay means for initially connecting said second moving contact to one of said output lines and thereafter disconnecting said decoding matrix from said second moving contact after said calling substation is connected to said first moving contact.

5. An intercommunicating telephone system comprising:
- a plurality of substations including a calling substation and a called substation, each of said substations having a unique binary calling code;
- a plurality of code conductors looped between said substations;
- binary encoding means including a selector drum located at said calling station for applying the binary calling code of said called station to said code conductors for private non-common talking interconnection between said calling station and said called station;
- a central equipment station to which each of said substations is connected.
- line selector means located at said central equipment station, having a moving contact connectable to a selected one of said substations;
- binary decoding means responsive to said unique binary calling codes to connect said moving contact to said called substation; and
- line finder mean located at said central equipment station, responsive to activation of said calling station, to connect said calling station to said line selector means.

6. An intercommunicating system as defined in claim 5 including:
- control relay means responsive to the activation of said calling station, and the application of said binary calling code to said code conductors, to disconnect said binary decoding means from said line selector means upon connection of said moving contact to said called substation.

7. An intercommunicating telephone system as defined in claim 5 including:
- a busy signal generator;
- first test means, operative in response to said line finder means, to establish a circuit path from said first test means to said calling station; and second test means, operative in response to said line selector means, to connect said busy signal generator to said first test means whenever said called station is connected to one of said substations prior to activation of said calling station, thereby completing a connection between said busy signal generator and said calling station.

8. The invention as defined in claim 5 wherein said selector drum includes mechanical means arranged thereon to represent said unique binary calling code.

9. The invention as defined in claim 8 wherein said mechanical means includes a plurality of holes formed in said drum arranged in predetermined sets whereby each of said sets is associated with one of a plurality of called stations.

References Cited by the Examiner

UNITED STATES PATENTS

| | | | |
|---|---|---|---|
| 2,656,417 | 10/1953 | Kilburg | 179—90.1 |
| 2,888,521 | 5/1959 | Doring | 179—100 |
| 3,111,562 | 11/1963 | Shoji | 179—90.02 |
| 3,189,692 | 6/1965 | Andregg et al. | 179—90.02 |
| 3,194,890 | 7/1965 | Haskins | 179—18 |

KATHLEEN H. CLAFFY, *Primary Examiner.*

L. A. WRIGHT, *Assistant Examiner.*